(12) United States Patent  (10) Patent No.: US 9,110,585 B2
Kim et al.  (45) Date of Patent: Aug. 18, 2015

(54) METHOD FOR PROVIDING USER INTERFACE USING DRAWN PATTERN AND MOBILE TERMINAL THEREOF

(75) Inventors: Taehun Kim, Incheon (KR); Jieun Park, Seoul (KR); Nayoung Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 109 days.

(21) Appl. No.: 13/220,290

(22) Filed: Aug. 29, 2011

(65) Prior Publication Data

US 2012/0184335 A1 Jul. 19, 2012

(30) Foreign Application Priority Data

Jan. 18, 2011 (KR) ........................ 10-2011-0005133

(51) Int. Cl.
*G06F 3/041* (2006.01)
*G06F 3/0488* (2013.01)

(52) U.S. Cl.
CPC .................................. *G06F 3/04883* (2013.01)

(58) Field of Classification Search
CPC ......... G06F 3/033; G06F 3/041; G06F 3/048; G06F 11/21; G06F 17/00; H04M 3/00; G09G 5/08
USPC ................. 345/158, 159, 160, 173, 177, 440; 715/702, 730, 764, 830, 863; 379/85; 455/418; 700/94; 382/187, 202
See application file for complete search history.

(56) References Cited

U.S. PATENT DOCUMENTS

| 5,991,441 | A  | * | 11/1999 | Jourjine ........................ 382/187 |
|---|---|---|---|---|
| 6,999,622 | B2 | * | 2/2006 | Komatsu ....................... 382/202 |
| 7,567,847 | B2 | * | 7/2009 | Basson et al. .................... 700/94 |
| 8,111,241 | B2 | * | 2/2012 | Weinberg et al. ............. 345/158 |
| 8,239,784 | B2 | * | 8/2012 | Hotelling et al. ............. 715/830 |
| 2005/0210418 | A1 | * | 9/2005 | Marvit et al. ................. 715/863 |
| 2009/0027338 | A1 | * | 1/2009 | Weinberg et al. ............. 345/158 |
| 2010/0053105 | A1 | * | 3/2010 | Choi ............................. 345/173 |
| 2010/0056128 | A1 | * | 3/2010 | Hwang et al. ................. 455/418 |
| 2010/0083190 | A1 | * | 4/2010 | Roberts et al. ................ 715/863 |
| 2010/0162182 | A1 | * | 6/2010 | Oh et al. ........................ 715/863 |
| 2010/0288108 | A1 | * | 11/2010 | Jung et al. ........................ 84/610 |
| 2010/0306718 | A1 | * | 12/2010 | Shim et al. .................... 715/863 |
| 2011/0041102 | A1 | * | 2/2011 | Kim .............................. 715/863 |
| 2011/0109577 | A1 | * | 5/2011 | Lee et al. ...................... 345/173 |

* cited by examiner

*Primary Examiner* — Lun-Yi Lao
*Assistant Examiner* — Johny Lau
(74) *Attorney, Agent, or Firm* — KED & Associates LLP

(57) ABSTRACT

Disclosed are a method for providing a user interface by mapping various types of multimedia to patterns drawn on a display, and a mobile terminal thereof. A user may draw a pattern according to his or her preference, and a controller may generate an object by mapping one or more multimedia data to the pattern. The controller may play the mapped multimedia data by tracking the multimedia data-mapped pattern. The controller may store the multimedia data-mapped pattern (object) in a memory. And, the controller may transmit the object to a selected specific party to provide an enhanced user interface (UI).

15 Claims, 16 Drawing Sheets

(A)

(B)

(C)

(D)

(A)  (B)  (C)

(D)  (E)

(A)

(B)

(C)

(D)

(A)

(B)

(A)

(B)

(C)

(A)

(B)

(C)

(D)

(A)            (B)

(A)

(B)

METHOD FOR PROVIDING USER INTERFACE USING DRAWN PATTERN AND MOBILE TERMINAL THEREOF

CROSS-REFERENCE TO RELATED APPLICATION(S)

Pursuant to 35 U.S.C. §119, this application claims the benefit of Korean Application No. 10-2011-0005133, filed on Jan. 18, 2011, the contents of which is hereby incorporated by reference herein in its entirety.

BACKGROUND OF THE INVENTION

1. Field of the Invention

This specification relates to a method for providing a user interface, and particularly, to a method for providing a user interface using a drawn pattern, and a mobile terminal thereof.

2. Background of the Invention

In general, a terminal may be classified into a mobile (portable) terminal and a stationary terminal according to a moveable state. The mobile terminal may be also classified into a handheld terminal and a vehicle mount terminal according to a user's carriage method.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

As the mobile terminal provides complicated and various functions, required is an enhanced user interface (UI) by mapping various types of multimedia data to patterns.

SUMMARY OF THE INVENTION

Therefore, an aspect of the detailed description is to provide a method for providing an enhanced user interface by mapping various types of multimedia to patterns drawn on a display (e.g., a touchpad of a mobile terminal) through a user's gestures.

Another aspect of the detailed description is to provide a method for providing drawing tools to edit patterns drawn through a user's gestures, and allowing the user to process patterns by using the drawing tool.

Still another aspect of the detailed description is to provide a method capable of mapping one or more types of multimedia data (e.g., voices, musical instrument sounds, music sounds, moving images, still images, location (position) information, and so on) to patterns drawn through a user's gestures, capable of playing the mapped multimedia data, and capable of transmitting the multimedia data-mapped patterns.

To achieve these and other advantages and in accordance with the purpose of this specification, as embodied and broadly described herein, there is provided a mobile terminal capable of implementing an enhanced user interface by mapping one or more multimedia data to a pattern drawn on a touchpad, the mobile terminal including: a memory to store a plurality of patterns, each mapped to a corresponding multimedia data; a display that includes a touchpad; a controller to detect a pattern drawn on the touchpad, the controller to map a multimedia data to the drawn pattern and to store the multimedia data-mapped pattern in the memory, and the controller to output the multimedia data in response to a user input; and a communication module to transmit information of the multimedia data-mapped pattern to a specific entity.

To achieve these and other advantages and in accordance with the purpose of this specification, as embodied and broadly described herein, there is also provided a method for providing a user interface capable of mapping one or more multimedia data to a pattern drawn for a time period according to a user's preference, the method including receiving an input of a pattern drawn on a display of a mobile terminal; mapping multimedia data to the drawn pattern; storing the multimedia data mapped to the pattern as a multimedia data-mapped pattern in a memory of the mobile terminal; receiving an input of a pointing device over the display; and outputting the mapped multimedia data from the mobile terminal in response to receiving the input of the pointing device.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a mobile terminal according to the present disclosure will be explained in more detail with reference to the attached drawings The suffixes attached to components of the mobile terminal, such as 'module' and 'unit or portion' were used for facilitation of the detailed description of the present disclosure. Therefore, the suffixes do not have different meanings from each other.

The mobile terminal according to the present invention may include a portable phone, a smart phone, a laptop computer, a digital broadcasting terminal, Personal Digital Assistants (PDA), Portable Multimedia Player (PMP), a navigation system, and so on. However, the present invention may be also applied to a fixed terminal such as a digital TV and a desk-top computer.

Figure 1:
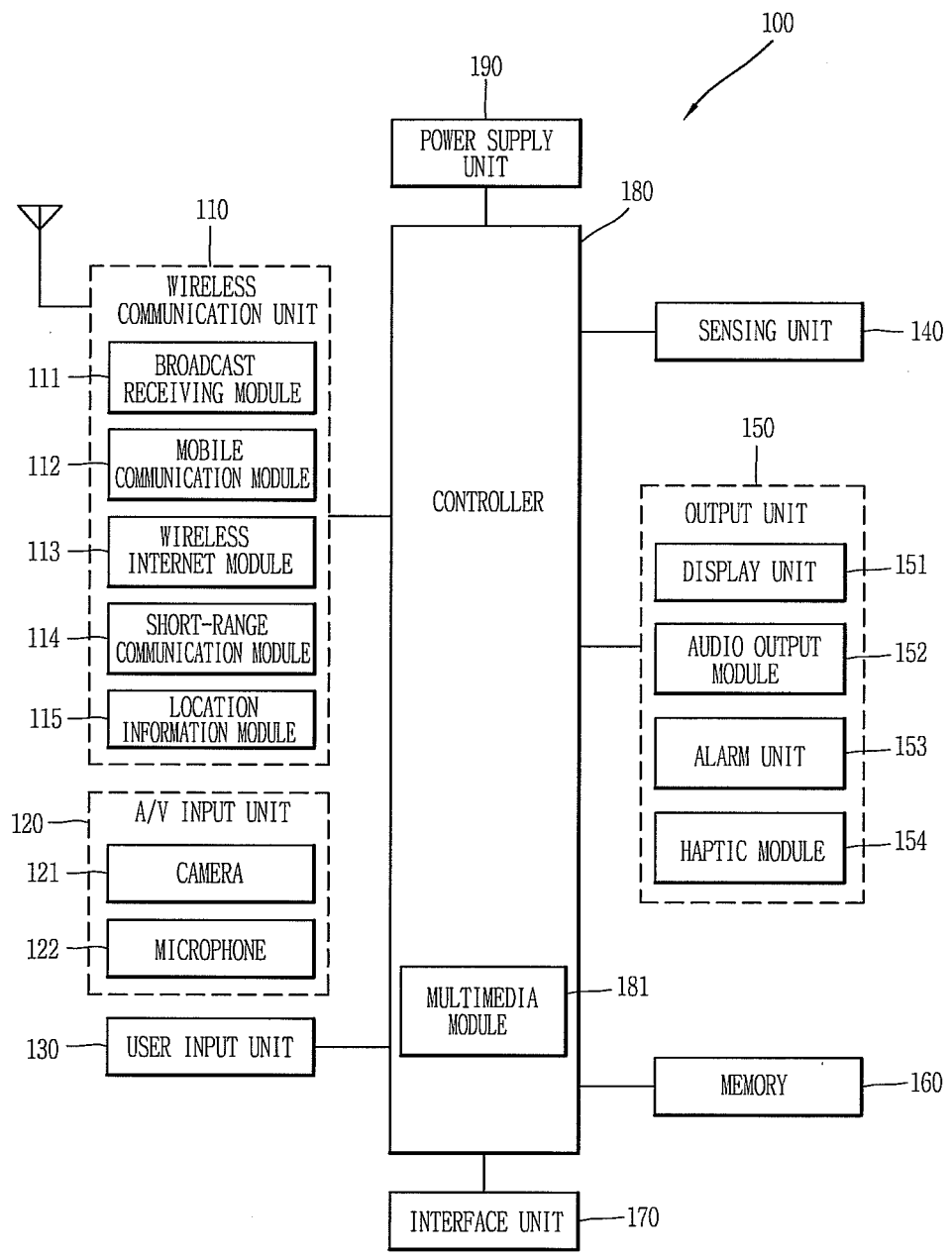
FIG. 1 is a block diagram of a mobile terminal according to a first embodiment of the present invention.

FIG. 1 is a block diagram of a mobile terminal according to one embodiment of the present invention.

The mobile terminal 100 may comprise components, such as a wireless communication unit 110, an Audio/Video (A/V) input unit 120, a user input unit 130, a sensing unit 140, an output module 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a position information module 115 and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

The broadcast associated information may indicate information relating to broadcast channels, broadcast programs or broadcast service providers. Further, the broadcast associated information may be provided via a mobile communication network and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T), and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external terminal, a server, and so on) on a mobile communication network. Here, the wireless signals may include audio call signal, video call signal, or various formats of data according to transmission/reception of text/multimedia messages.

The wireless internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The position information module 115 denotes a module for detecting or calculating a position of a mobile terminal. An example of the position information module 115 may include a Global Position System (GPS) module. Under the current technique, the GPS module can measure accurate time and distance respectively from more than three satellites so as to accurately calculate a current position of the mobile terminal based on such three different distances according to a triangulation scheme. A scheme may be used to obtain time information and distance information from three satellites and correct error by one satellite. Also, the GPS module may continuously calculate a current position in real time so as to obtain speed information.

The NV input unit 120 is configured to provide audio or video signal input to the mobile terminal. The NV input unit 120 may include a camera 121 and a microphone 122. The camera 121 receives and processes image frames of still pictures or video acquired by image sensors in a video (telephony) call mode or a capturing mode. The processed image frames may be displayed on a display 151.

The image frames processed by the camera 121 may be stored in the memory 160 or transmitted to the exterior via the wireless communication unit 110. Two or more cameras 121 may be provided according to the use environment of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the orientation of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device and the like. Moreover, the sensing unit 140 may include a proximity sensor 141, which will be later explained in relation to a touch screen.

The output unit 150 is configured to output an audio signal, a video signal or an alarm signal. The output unit 150 may include a display 151, an audio output module 152, an alarm 153, a haptic module 154, and the like.

The display 151 may output information processed in the mobile terminal 100. For example, when the mobile terminal is operating in a phone call mode, the display 151 will provide a User Interface (UI) or a Graphic User Interface (GUI) which includes information associated with the call. As another example, if the mobile terminal is in a video call mode or a capturing mode, the display 151 may additionally or alternatively display images captured and/or received, UI, or GUI.

The display 151 may include at least one of a Liquid Crystal Display (LCD), a Thin Film Transistor-Liquid Crystal Display (TFT-LCD), an Organic Light-Emitting Diode (OLED), a flexible display and a three-dimensional (3D) display.

Some of the displays can be configured to be transparent such that it is possible to see the exterior therethrough. These displays may be called transparent displays. A representative example of the transparent display may include a Transparent Organic Light Emitting Diode (TOLED), and the like. The rear surface portion of the display 151 may also be implemented to be optically transparent. Under this configuration, a user can view an object positioned at a rear side of a body through a region occupied by the display 151 of the body.

The display 151 may be implemented in two or more in number according to a configured aspect of the mobile terminal 100. For instance, a plurality of displays may be arranged on one surface integrally or separately, or may be arranged on different surfaces.

Here, if the display 151 and a touch sensitive sensor (referred to as a touch sensor) have a layered structure therebetween, the structure may be referred to as a touch screen. The display 151 may be used as an input device rather than an output device. The touch sensor may be implemented as a touch film, a touch sheet, a touchpad, and the like.

The touch sensor may be configured to convert changes of a pressure applied to a specific part of the display 151, or a capacitance occurring from a specific part of the display 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display 151 has been touched.

Referring to FIG. 1, a proximity sensor 141 may be arranged at an inner region of the mobile terminal covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Accordingly, if the pointer is in proximity to the touch screen without contacting the touch screen, the position of the pointer and a distance between the pointer and the touch screen may be detected. Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, and so on). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the mobile terminal 100, e.g., sound alarming a call received or a message received, and so on. The audio output module 152 may include a receiver, a speaker, a buzzer, and so on.

The alarm 153 outputs signals notifying occurrence of events from the mobile terminal 100. The events occurring from the mobile terminal 100 may include call received, message received, key signal input, touch input, and so on. The alarm 153 may output not only video or audio signals, but also other types of signals such as signals notifying occurrence of events in a vibration manner. For instance, the alarm 153 may be configured to vibrate responsive to the mobile terminal receiving a call or message. As another example, when a key signal has been inputted, the alarm 153 may output vibration as a feedback of the key signal input. Through this vibration output, a user may recognize the occurrence of an event. Here, a signal indicating the occurrence of an event may be outputted through the display 151 or the audio output module 152.

The haptic module 154 generates various tactile effects which a user can feel. A representative example of the tactile effects generated by the haptic module 164 includes vibration. Vibration generated by the haptic module 164 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data relating to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Figure 2A:
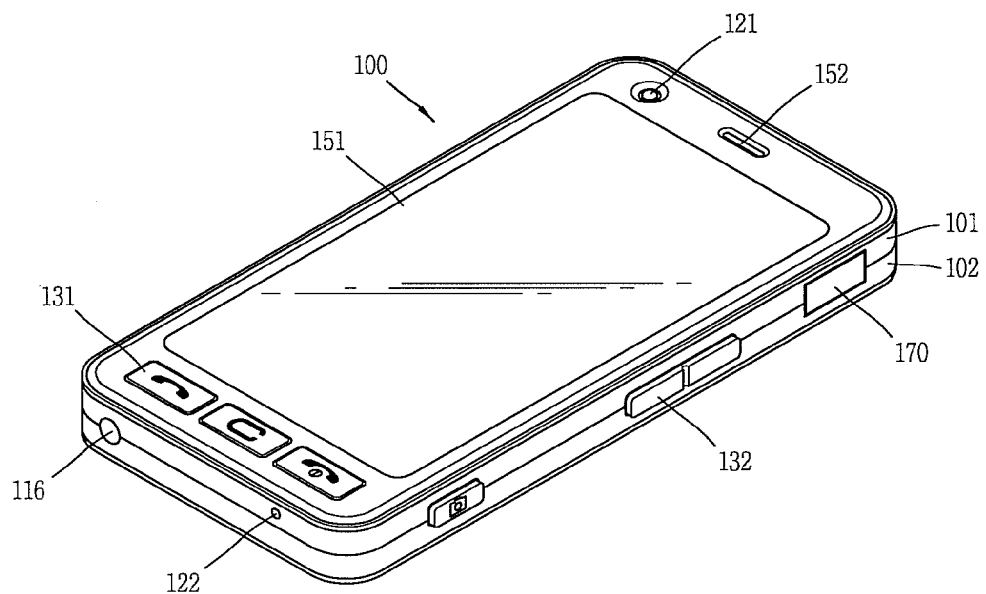
FIG. 2A is a front perspective view of a mobile terminal according to a first embodiment of the present invention.

FIG. 2a is a perspective view of a mobile terminal according to one embodiment of the present invention.

The mobile terminal 100 described is a bar type mobile terminal. However, the present invention may be applied to a slide type mobile terminal having two bodies coupled to each other so as to be relatively movable, a folder type, a swing type, a swivel type and the like.

A case (casing, housing cover, and so on) forming the appearance of a body is formed by a front case 101 and a rear case 102. Each kind of electronic components are mounted in a space formed by the front case 101 and the rear case 102. If desired, one or more intermediate cases may be provided between the front case 101 and the rear case 102.

The front and rear cases are usually formed by injection-molding resin material, or formed using metallic material such as stainless steel (STS) and titanium (Ti).

On the front case 101 of the terminal body, may be disposed a display 151, an audio output unit 152, a camera 121, user input units 130/131, 132, a microphone 122, an interface unit 170, and so on.

The display 151 may occupy most of a main surface of the front case 101. The audio output module 152 and the camera 121 are disposed at a region adjacent to one of both end portions of the display 151, and the user input unit 131 and the microphone 122 are disposed at a region adjacent to another end portion thereof. The user input unit 132, the interface unit 170 and the like may be disposed at side surfaces of the front case 101 and the rear case 102.

The user input unit 130 may be manipulated to receive a command input for controlling the operation of the mobile terminal 100, and include the first and second manipulation units 131 and 132. The first and second manipulation units 131 and 132 may be referred to as a manipulating portion. The manipulating portion may be operated by a user in any tactile manner.

Contents input by the first and second manipulation units 131 and 132 may variously be set. For example, the first manipulation unit 131 may be configured to input commands such as START, END, SCROLL or the like, and the second manipulation unit 132 may be configured to input a command, such as adjusting an audio sound outputted from the audio output unit 152, a conversion of the display 151 into a touch-sensitive mode or the like.

Figure 2B:
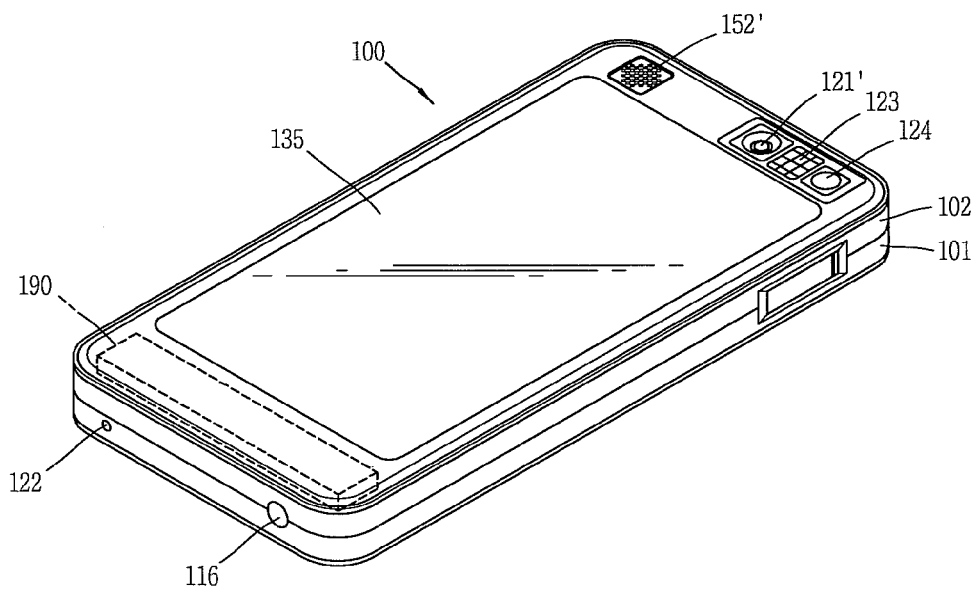
FIG. 2B is a rear perspective view of a mobile terminal according to a first embodiment of the present invention.

FIG. 2b is a rear perspective view of the mobile terminal shown in FIG. 2A.

As shown in FIG. 2b, a rear surface of the terminal body, namely, the rear case 102 may further be provided with a camera 121'. The camera 121' faces a direction which is opposite to a direction faced by the camera 121, and may have different pixels from those of the camera 121.

For example, the camera 121 may operate with relatively lower pixels (lower resolution). Thus, the camera 121 may be useful when a user can capture his face and send it to another party during a video call or the like. On the other hand, the camera 121' may operate with a relatively higher pixels (higher resolution) such that it can be useful for a user to obtain higher quality pictures for later use. Such cameras 121 and 121' may be installed in the terminal body to be rotatable or popped up.

A flash 123 and a mirror 124 may additionally be disposed adjacent to the camera 121'. The flash 123 operates in conjunction with the camera 121' when taking a picture using the camera 121'. The mirror 124 can cooperate with the camera 121' to allow a user to photograph himself in a self-portrait mode.

An audio output module 152' may further be disposed at a rear surface of the terminal body. The audio output module 152' can cooperate with the audio output module 152 (see FIG. 2a) to provide stereo output. Also, the audio output module 152' may be configured to operate as a speakerphone.

A broadcast signal receiving antenna 116 may further be disposed at the side surface of the terminal body in addition to an antenna for communications. The antenna 116 configuring a part of the broadcast receiving module 111 (see FIG. 1) may be retractable into the terminal body.

A power supply unit 190 for supplying power to the mobile terminal 100 may be mounted to the terminal body. The power supply 190 may be internally disposed at the terminal body, or be detachably disposed outside the terminal body.

A touchpad 135 for detecting a touch input may further be disposed at the rear case 102. The touchpad 135 may also be configured to be transparent, as similar to the display 151. In this case, if the display 151 is configured to output visible information on its both surfaces, such visible information can be identified via the touchpad 135. Information output on the both surfaces may all be controlled by the touchpad 135. Unlike to this, a display may further be mounted on the touchpad 135 so as to dispose a touch screen even at the rear case 102.

The touchpad 135 operates in cooperation with the display 151 of the front case 101. The touchpad 135 may be disposed at the rear side of the display 151 in parallel. Such touchpad 135 may be the same as or smaller than the display 151. For convenience, it is assumed that the touchpad 135 is disposed on the display 151 in a layered structure.

Hereinafter, description will be given of a cooperative operating mechanism between the display 151 and the touchpad 135 with reference to FIGS. 3A and 3B.

Figure 3A:
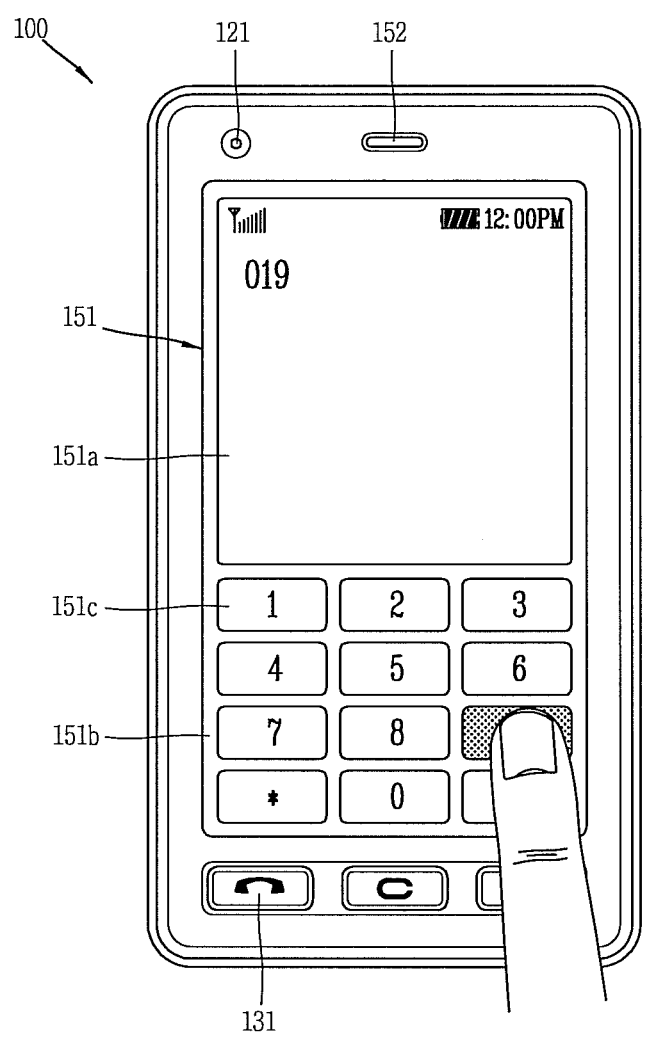
FIGS. 3A and 3B are front views of a mobile terminal according to the present invention, which show an operation of the mobile terminal.
Figure 3B:
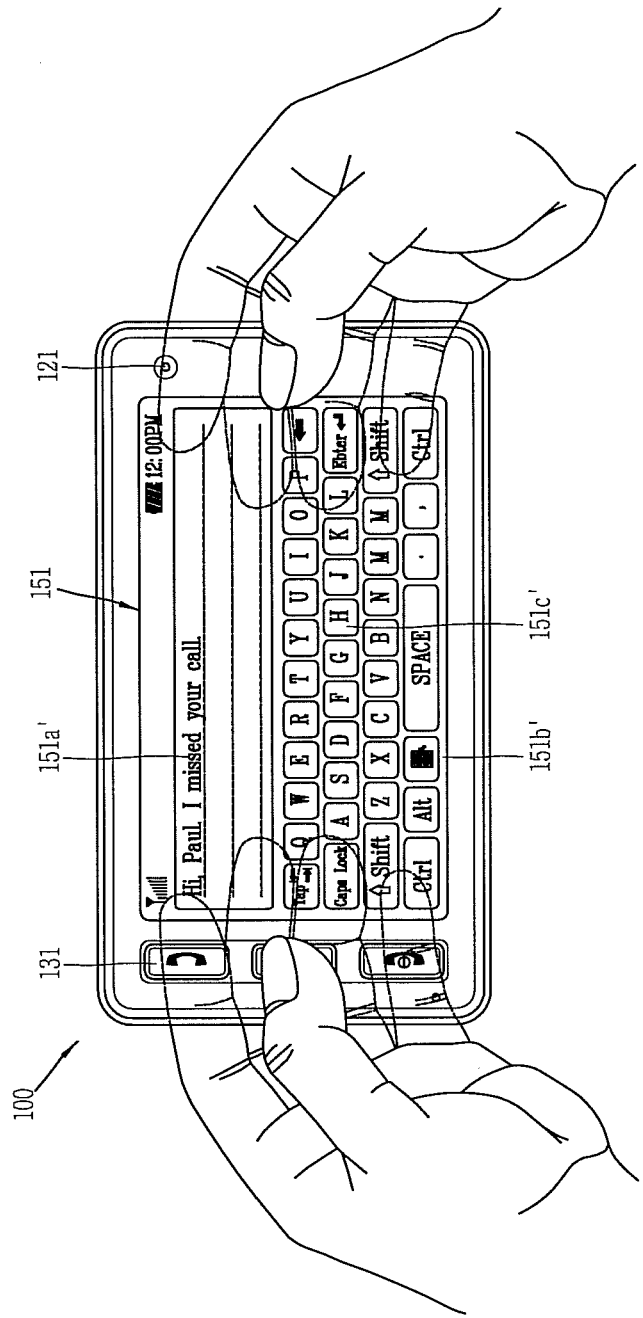

FIGS. 3A and 3B are front views of the mobile terminal each for illustrating an operation state of the mobile terminal in accordance with the present invention.

Various types of visible information may be displayed on the display 151. Such information may be displayed in several forms, such as character, number, symbol, graphic, icon or the like.

For input of the information, at least one of characters, numbers, graphics or icons may be arranged and displayed in a preset configuration, thus being implemented in the form of a keypad. Such keypad may be called 'soft key.'

FIG. 3a illustrates a touch input applied onto a soft key through the front surface of the terminal body.

The display 151 may be operated as a single entire region or by being divided into a plurality of regions. For the latter, the plurality of regions may cooperate with one another.

For example, an output window 151a and an input window 151b may be displayed at upper and lower portions of the display 151, respectively. Soft keys 151c representing numbers for inputting telephone numbers or the like may be output on the input window 151b. When a soft key 151c is touched, a number or the like corresponding to the touched soft key 151c is output on the output window 151a. Upon manipulating the first manipulation unit 131, a call connection for a telephone number displayed on the output window 151a is attempted.

FIG. 3b illustrates a touch input applied onto a soft key through a rear surface of the terminal body. FIG. 3a illustrates that the terminal body is placed in a portrait direction, whereas FIG. 3b illustrates that the terminal body is placed in a landscape direction. The terminal is allowed to change an output screen displayed on the display 151 according to the placed direction of the terminal body.

FIG. 3b illustrates an operation of the mobile terminal in a text input mode. The display 151 displays an output window 151a' and an input window 151b'. The input window 151b' may have soft keys 151c' representing at least one of characters, symbols and numbers arranged in plural rows. The soft keys 151c' may alternatively be arranged in a QWERTY configuration.

Upon touching the soft key 151c' via the touchpad 135, a character, number or symbol corresponding to the touched soft key 151c' is displayed on the output window 151a'. As such, as compared to the touch input via the display 151, the touch input via the touchpad 135 may have an advantage in that the soft key 151c' can be prevented from being obscured by a finger. Even when the display 151 and the touchpad 135 are transparent, fingers located at the rear surface of the terminal body are visible, which allows the more accurate touch input.

In addition to the input manner illustrated in the embodiments, the display 151 or the touchpad 135 of FIG. 1 may be scrolled to receive a touch input. A user may scroll the display 151 or the touchpad 135 to move a cursor or pointer positioned on an object (subject), e.g., an icon or the like, displayed on the display 151. In addition, in case of moving a finger on the display 151 or the touchpad 135, the path of the finger being moved may be visibly displayed on the display 151, which can be useful upon editing an image displayed on the display 151.

One function of the mobile terminal may be executed in correspondence with a case where the display 151 (touch screen) and the touchpad 135 are touched together within a preset time. An example of being touched together may include clamping a terminal body with the user's thumb and index finger. The one function, for example, may be activating or deactivating of the display 151 or the touchpad 135.

The proximity sensor 141 having described with reference to FIG. 1 will be described in more detail with reference to FIG. 4.

Figure 4:
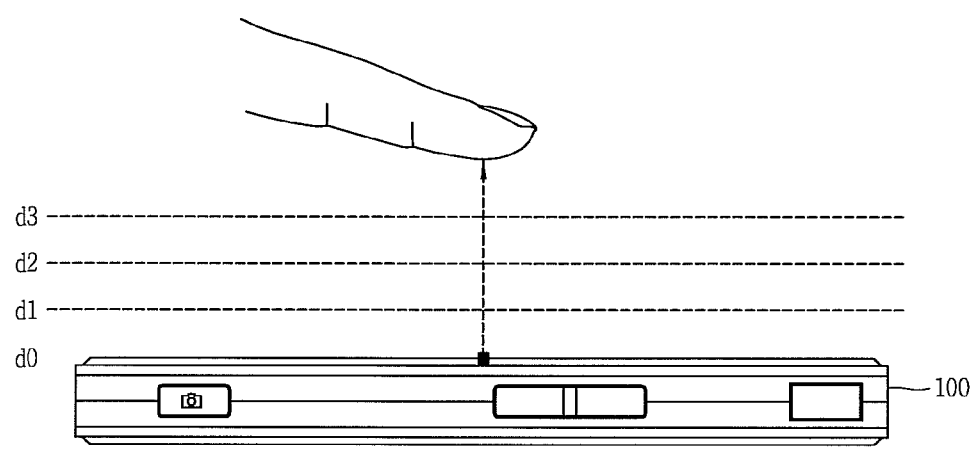
FIG. 4 is a conceptual view for explaining a proximity depth of a proximity sensor.

FIG. 4 is an overview showing a proximity depth of the proximity sensor.

The proximity sensor 141 may be configured to output different proximity signals depending on a distance between the approached pointer and the touch screen (hereinafter, referred to as "proximity depth").

FIG. 4 exemplarily shows a section of the touch screen having the proximity sensor, which can detect three proximity depths, for example. However, a proximity sensor which can detect less than three proximity depths or more than four proximity depths may be employed.

In detail, if the pointer completely contacts the touch screen (see $d_0$), it may be recognized as a contact touch. If the pointer is spaced apart from the touch screen by less than a distance $d_1$, it may be recognized as a proximity touch with a first proximity depth. If the pointer is positioned above the touch screen between the distance $d_1$ and a distance $d_2$, it may be recognized as a proximity touch with a second proximity depth. If the pointer is spaced apart from the touch screen by more than the distance $d_2$ and less than a distance $d_3$, it may be recognized as a proximity touch with a third proximity depth. If the pointer is positioned above the touch screen farther than the distance $d_3$, it may be recognized as the proximity touch being released.

Hence, the controller 180 may recognize the proximity touches as various input signals according to the proximity depths and proximity positions of the pointer, so as to control various operations.

Hereinafter, a method for providing a user interface using patterns drawn on the mobile terminal will be explained in more details with reference to the attached drawings. The following embodiments may be used solely or in a combination manner. Alternatively, the following embodiment may be used by being combined with the aforementioned user interface (UI).

EXPLANATIONS FOR TERMS

Hereinafter, terms used in the present invention will be explained for convenience.

Pattern: This indicates a comprehensive term including lines or diagrams drawn by a user's fingers or a stylus pen, and so on. For instance, the pattern includes not only lines (e.g., straight lines, curved lines, circular arcs, closed curved lines, hyperbolic curved lines, and so on) and diagrams, but also designs, colors, and so on.

Object: This indicates contents generated by mapping one or more multimedia data to a pattern drawn by a user. That is, the object indicates a pattern to which multimedia data has been mapped.

The embodiments of the present invention may be implemented by the mobile terminal 100 shown in FIGS. 1 to 4. Explanations for a User Interface to Generate Objects by Mapping Various Types of Multimedia Data to Drawn Patterns Hereinafter, with reference to FIGS. 5 to 15, will be explained a method for mapping various types of multimedia data to drawn patterns and utilizing (e.g., playing, transmitting, processing, and so on) the drawn patterns, and an operation of the mobile terminal 100 for implementing the method.

Once a user draws a specific pattern (e.g., lines) on the touchpad 135 by using his or her finger or a stylus pen, and so on, the controller 180 detects the drawn pattern. Then, the controller 180 maps one or more multimedia data and/or various types of multimedia data (e.g., voices, sound sources, entertainers' voices, sounds of musical instruments, still images, moving images, position information, and so on) to the drawn pattern. Then, the controller 180 stores the multimedia data-mapped pattern in the memory 160. Accordingly, the memory 160 may store therein various types of patterns, each pattern mapped with different multimedia data. Alternatively, the controller 180 may sort objects generated by mapping the multimedia data to the drawn patterns, according to a pattern type or a pattern shape (or a multimedia type), thereby generating a corresponding folder (or mapped pattern book) and storing the generated folder in the memory 160.

The controller 180 may execute each object generated by mapping multimedia to a specific pattern, or may transmit the multimedia data-mapped pattern to a selected specific party. A method for executing an object generated by mapping specific multimedia to a specific pattern will be explained.

The controller 180 loads a specific object selected by a user (e.g., an object recorded with a call voice in a case that multimedia data of a call voice has been mapped to a pattern drawn by a user) from objects stored in the memory 160, and displays the loaded specific object on the display 151.

Once the user tracks the pattern of the object with using his or her finger or a stylus pen, the controller 180 detects the tracked pattern thus to play the multimedia data (e.g., 'call voice') mapped on the specific pattern.

The controller 180 outputs the played multimedia data, i.e., the 'call voice' mapped to the specific pattern, on the sound output module 152 and/or the display 151.

The controller 180 provides a tool for editing objects generated by mapping various types of multimedia data to specific patterns, processes shapes and types of the patterns of the objects with using the tool, and manages objects corresponding to the processed patterns.

The controller 180 may control one or more objects stored in the memory 160 so as to be displayed on the display 151. Alternatively, the controller 180 may execute objects generated by mapping various types of multimedia data to specific patterns, through an operation scheduling or at the same time. For instance, the controller 180 may play or display multimedia data on a screen while transmitting objects generated by mapping various types of multimedia data to specific patterns to a specific party.

Types of Gestures

The controller 180 may detect various patterns input to the user input unit 130 (e.g., touchpad). These various patterns are input by gestures. A user may draw various patterns on a screen through various gestures. Hereinafter, examples of the various gestures will be explained.

The user input unit 130 may detect various gestures by using a touch sensor. For instance, the gestures may include 'tap', 'drag', 'flick', 'swipe', 'double tap', 'touch & hold', 'slicing', and so on using a user's finger or a stylus, and so on.

The 'tap' gesture indicates the most fundamental gesture for touching a user interface element on a screen, which means a motion contacting a user's finger or a stylus on a touch screen for a short time. This 'tap' gesture is same as a single click of a mouse. A touch motion, a long press motion, and so on may indicate the same motion.

The 'drag' gesture indicates a motion for scrolling a touch screen to a specific direction. For instance, the 'drag' gesture is used to scroll a screen in up and down directions from a scrollable user interface element.

The 'flick' gesture indicates a gesture for dragging a touch screen and then detaching a user's finger or a stylus from the touch screen within a short time. For instance, the 'flick' gesture is used to rapidly scroll a touch screen in up and down directions from a scrollable user interface element.

The 'swipe' gesture indicates a gesture for strongly dragging a touch screen with using a user's finger or a stylus. For instance, the 'swipe' gesture is used to display hidden menus corresponding to respective items on a list.

The 'double tap' gesture indicates a consecutive double tap motion. For instance, this 'double tap' is used to locate contents or images at an intermediate region of a screen through zoom-in, or to perform a zoom-out function. When playing (executing) an object generated by mapping multimedia to a drawn pattern, a specific part of the pattern may be double-tapped so that the multimedia mapped to the pattern can be executed.

The 'touch & hold' gesture indicates a motion for touching a touch screen with using a user's finger or a stylus, and maintaining the touched state for a predetermined time. This 'touch & hold' gesture may be referred to as 'long press'. A user may draw a desired pattern on a touchpad by using the 'touch & hold' gesture. This 'touch & hold' gesture may be also used to display an enlarged view with respect to a cursor positioned on an editable text. This 'touch & hold' gesture may be also used to overlap a specific pattern with another pattern.

The touch screen of the mobile terminal 100 may detect a multi-touch. In this case, a 'pinch open' gesture and a 'pinch close' gesture may be further included.

The 'pinch open' gesture indicates a gesture for widening two fingers which are currently on touch screen like an operation to extend the touch screen. When editing a pattern, the 'pinch open' gesture is used to increase a length of a specific pattern, or enlarge a size of a specific pattern. The 'pinch open' gesture is used to zoom-in a map screen in a map viewing mode. The 'double tap' gesture is used to automatically zoom-in by a predetermined ratio, whereas the 'pinch open' gesture is used to adjust a zoom-in level based on an extended degree of a user's fingers.

The 'pinch close' gesture has a contrary concept to the 'pinch open' gesture, which indicates a gesture to narrow two fingers on a touch screen. For instance, the 'pinch open' gesture is used to zoom-in a map screen in a map viewing mode. When editing an object, the 'pinch open' gesture may be used to decrease a length of a specific pattern, or contract a size of a specific pattern.

The 'slicing' gesture is used to cut a pattern for edition.

Hereinafter, will be explained embodiments for generating objects by mapping multimedia data to drawn patterns with using various gestures, and for executing the generated objects.

FIGS. 5A to 5E are views showing processes for drawing patterns and mapping multimedia data to the drawn patterns according to a first embodiment of the present invention. In FIG. 5, a call voice (a caller's voice and a callee's voice) is used as the multimedia data.

During a call with a callee, a caller may draw preferred visual patterns and record call voices by mapping to the drawn patterns. Alternatively, while call voices of a caller and a callee are mapped to patterns for recording, image information on the caller and the callee, and or information on call details (e.g., contact information, phone number (i.e., phone number '010-5554-4545' as shown in FIGS. 5d and 5e), recent call time, call-related statistics) may be mapped to the patterns.

Hereinafter, the first embodiment of the present invention will be explained with reference to FIG. 5.

Once a user performs a tap gesture on the touchpad 135 during a call as shown in FIG. 5a and draws a pattern through a 'touch & hold' gesture as shown in FIG. 5b, call voices are recorded during the pattern drawing. That is, the controller 180 detects an input (drawn pattern) on the touchpad 135, and determines that the mobile terminal 100 is currently in a call state. Then, the controller 180 real-time maps call voices of a caller and a callee to the drawn pattern. This real-time mapping will be explained as follows. More concretely, the touch sensor (the touch sensor may be integrally implemented with the controller, or may be individually implemented from the controller) detects coordinate values of the pattern drawn on the touchpad 135, and transmits the detected coordinate values to the controller 180. Then, the controller 180 stores the call voices in the memory. Here, the controller 180 may store the call details together with the coordinate values (e.g., coordinate values of the touchpad) of the drawn pattern in a correlating manner. Also, the controller 180 may store a callee's information together with a caller (user)'s information (e.g., phone numbers, images, call time, and so on)

FIG. 5c is a view showing a process for executing an object. More concretely, FIG. 5c is a view showing a process for executing multimedia data (call voices) mapped to the drawn pattern through FIGS. 5a and 5b. Once a user tracks a pattern shown in FIG. 5c through a 'touch & hold' gesture, call voices mapped to the pattern is output through a speaker. If the object is mapped with a caller or a callee's information (e.g., images, phone numbers (i.e., 010-5554-4545 as shown in FIG. 5d), and so on) together with call voices, the information may be displayed on a screen while the call voices are output.

FIG. 5e is a view showing a process for executing an object generated in FIGS. 5a and 5b through a 'double tap' gesture, not a 'touch & hold' gesture. If a user double-taps a part of a pattern in FIG. 5e, a progressive bar is moved to execute (play) corresponding multimedia data (call voices, and/or other information such as images, phone numbers (i.e., 010-5554-4545 as shown in FIG. 5d) and call time) of an object generated in FIGS. 5a and 5b. The process for executing an object generated in FIGS. 5a and 5b may be implemented through various gestures. And, a UI, a method for displaying other information such as images, phone numbers and call time on a screen may be variously implemented.

FIGS. 6a to 6d are views showing processes for drawing patterns and mapping multimedia data to the drawn patterns according to a second embodiment of the present invention. FIG. 6 of the second embodiment is different from FIG. 5 of the first embodiment in that two patterns are drawn and multimedia data is mapped to the respective patterns. Hereinafter, the second embodiment will be explained on the assumption that a user records call voices during a call with a callee.

A user may wish to record his or her voice and a callee's voice individually during a call. As shown in FIG. 6, the user may draw patterns (pattern 1 and pattern 2) on a touchpad through a 'touch & hold' gesture with using fingers or a stylus pen, and so on. For instance, the user may record his or her voice by mapping to the pattern 1, and may record a callee's voice by mapping to the pattern 2. Once the user draws patterns (pattern 1 and pattern 2) and performs gestures (e.g., 'double tap' gesture) as shown in FIGS. 6A and 6B, the controller may generate objects by mapping the user's voice and a callee's voice to the patterns. In case of generating objects by drawing patterns on the touchpad as shown in FIGS. 6A and 6B, time may be preset with respect to a length of the drawn patterns. For instance, if a length of each pattern is preset as three minutes in FIGS. 6A and 6B, each pattern is recorded with a call voice for three minutes. The process for mapping a call voice to each pattern in FIG. 6 corresponds to the operation of the controller 180 of FIG. 5 according to the first embodiment. FIG. 6c is a view showing a process for executing objects generated by mapping a caller's voice and a callee's voice to each drawn pattern. The process for executing objects shown in FIG. 6c is the same as the process shown in FIG. 5c.

FIG. 6d is a view showing a process for generating (processing) an object by overlapping the pattern 1 with the pattern 2. More concretely, once the pattern 1 mapped with a caller's voice is moved to the pattern 2 mapped with a callee's voice through a 'touch & hole' gesture, obtained is the same object as the object generated through FIGS. 5a and 5b. That is, if the pattern 1 is overlapped with the pattern 2 in FIG. 6d, generated (processed) is an object that a caller's voice and a callee's voice are integrated as one pattern. Accordingly, if the object generated by overlapping the patterns with each other is executed as shown in FIG. 6d, the results of FIGS. 5c to 5e may be obtained.

Figure 5:
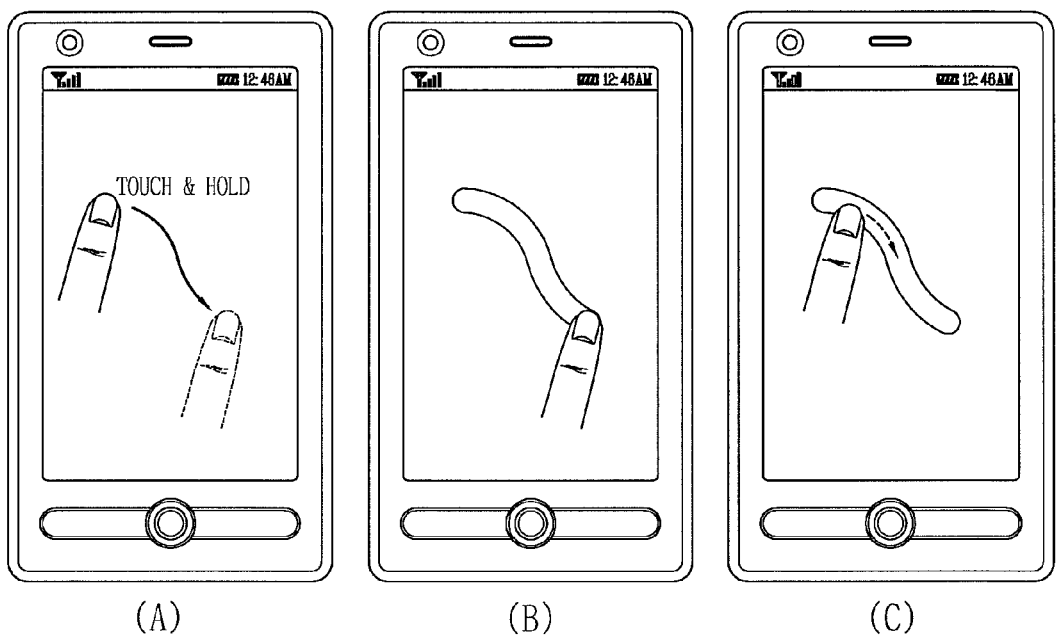
FIGS. 5A to 5E are views showing processes for drawing patterns and mapping multimedia data to the drawn patterns according to a first embodiment of the present invention.
Figure 5:
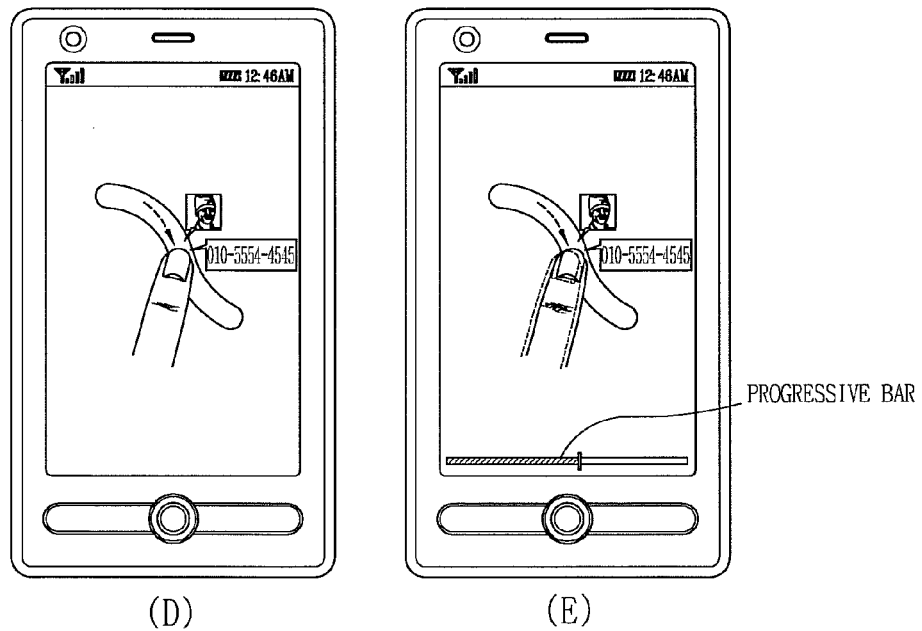
Figure 6:
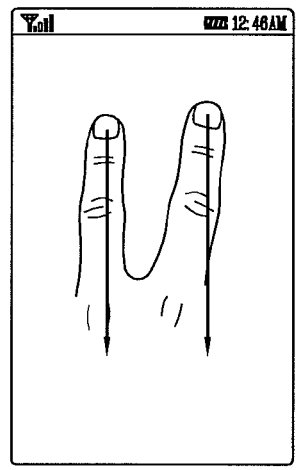
FIGS. 6A to 6D are views showing processes for drawing patterns and mapping multimedia data to the drawn patterns according to a second embodiment of the present invention.
Figure 6:
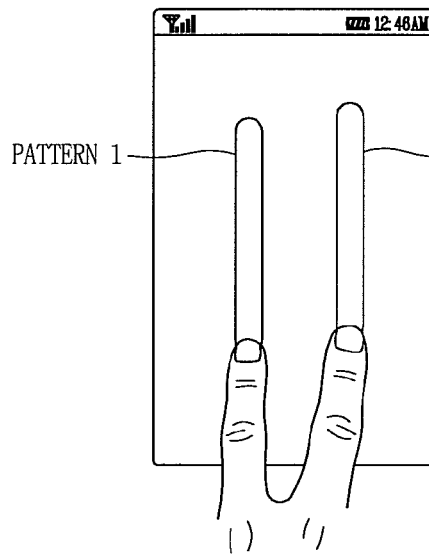
Figure 6:
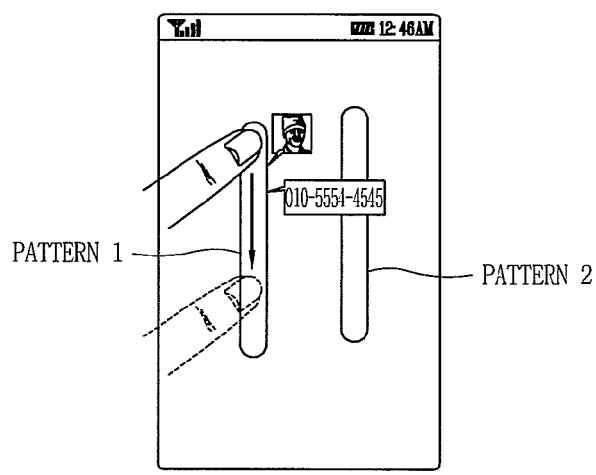
Figure 6:
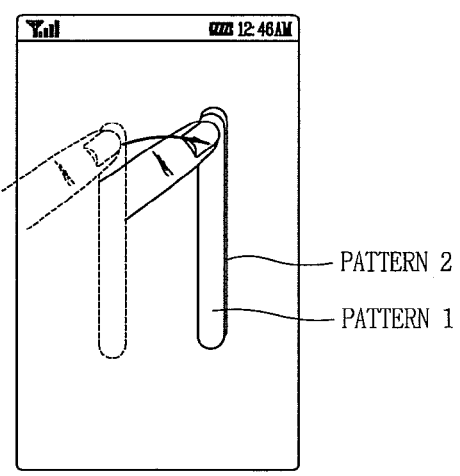

Alternatively, in the first embodiment of FIG. 5 and the second embodiment of FIG. 6, the controller 180 may generate an object by mapping, to a drawn pattern, a musical instrument sound or a voice actor (actress) (e.g., entertainer) 's voice rather than a caller's voice or a callee's voice. Still alternatively, in the first embodiment of FIG. 5 and the second embodiment of FIG. 6, the controller 180 may generate an object by mapping, to a drawn pattern, background music (e.g., a musical instrument sound, a piece of music, a popular song, an effective sound, and so on) together with a caller's voice or a callee's voice. This process for generating an object will be explained in more details with reference to FIG. 7.

Figure 7:
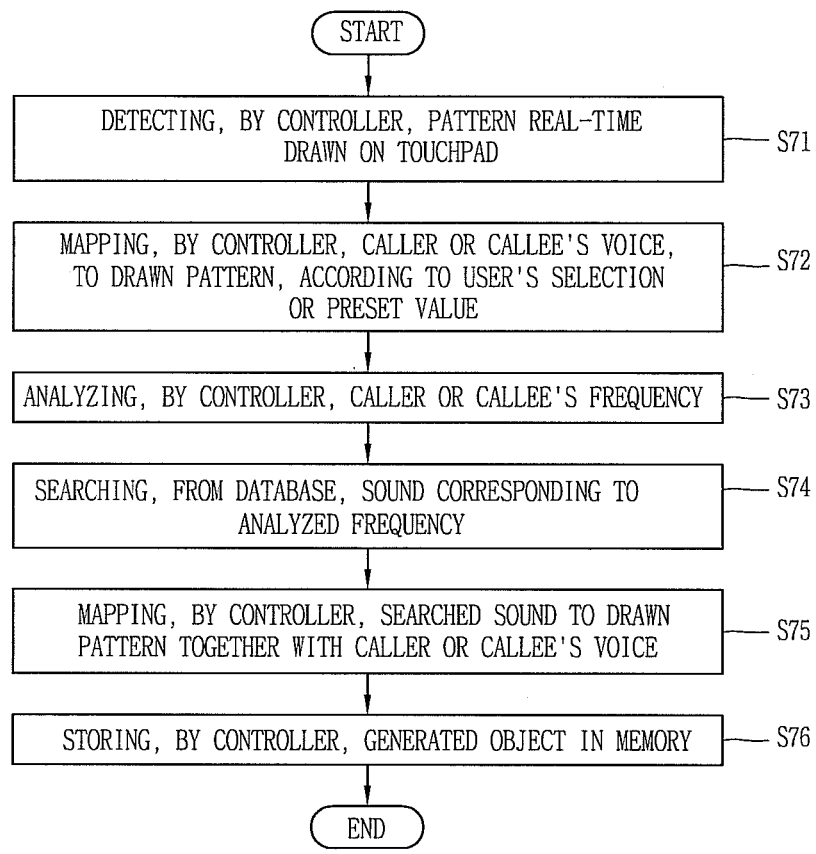
FIG. 7 is a flowchart showing processes for generating objects by mapping multimedia data to drawn patterns.

FIG. 7 is a flowchart showing processes for generating objects by mapping multimedia data to drawn patterns. For convenience, it is assumed that a caller's voice and/or a callee's voice are used as the multimedia data of FIG. 7.

Referring to FIG. 7, the controller 180 detects patterns real-time drawn on the touchpad 135 (S71). Alternatively, the controller 180 may extract pre-drawn patterns from the memory. Here, each of the pre-drawn patterns has to be provided with time set with respect to a length thereof.

The controller 180 selects multimedia data to be mapped to the drawn pattern, e.g., a caller's voice and/or a callee's voice, and then maps the selected multimedia data the drawn pattern (S72~S75).

When mapping a caller's voice or a callee's voice to the drawn pattern according to a user's selection or a preset value, the controller 180 may map one or more information of the caller or the callee (e.g., images, phone numbers, musical instrument sounds, call time, and so on) together (S72). Here, the information may be determined by a user's selection or a preset value. For instance, on the assumption that the information is a musical instrument sound and the information is determined by a preset value, the controller 180 analyzes a caller's frequency or a callee's frequency (S73). Then, the controller 180 searches for a sound corresponding to the analyzed frequency (e.g., musical instrument sound), from a database separately implemented in the memory (S74). Then, the controller 180 maps the searched sound (e.g., musical instrument sound) to the drawn pattern together with the caller or callee's voice (S75). Objects generated through these procedures serve as multimedia contents. The controller 180 stores the generated objects in the memory according to a user's selection (S76). Alternatively, the controller 180 may transmit the generated objects to a specific party according to a user's selection or a preset value. Still alternatively, the controller 180 may extract objects from the memory and execute the extracted objects.

Figure 8:
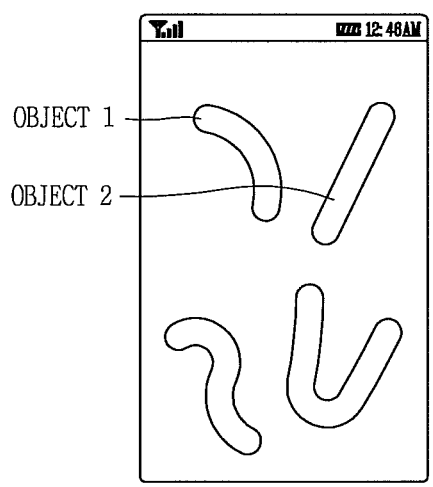
FIGS. 8A and 8B are views showing a method for using generated objects according to a third embodiment of the present invention.
Figure 8:
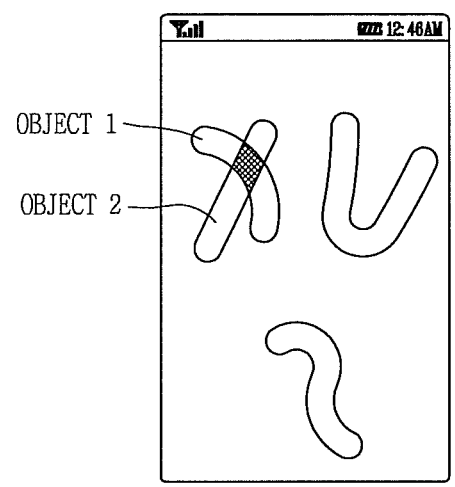
Figure 9:
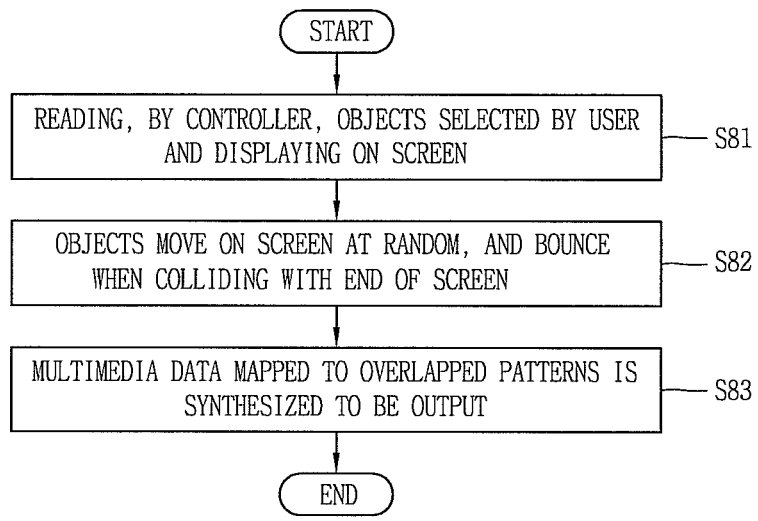
FIG. 9 is a flowchart showing the third embodiment of FIG. 8.

FIGS. 8A and 8B are views showing a method for using generated objects according to a third embodiment of the present invention, and FIG. 9 is a flowchart showing the third embodiment of FIG. 8. Hereinafter, the third embodiment will be explained with reference to FIGS. 8 and 9.

As shown in FIG. 8, the controller 180 may extract objects selected by a user from the memory, and display the objects on a screen (S81). In FIG. 8, the objects are used in a game mode. However, the objects shown in FIG. 8 may be used in various modes. More concretely, the objects shown in FIG. 8a move on the screen at random, and bounce when colliding with the end of the screen (S82). If the objects moving on the screen are overlapped with each other as shown in FIG. 8b, multimedia data mapped to the overlapped patterns is integrated with each other to be output (played) (S83). For instance, if the object 1 and the object 2 shown in FIG. 8b are implemented as music played with specific musical instruments, sounds corresponding to the overlapped patterns (e.g., sound of the object 1 and sound of the object 2) are synthesized to each other to be output through the speaker of the mobile terminal 100. Each of the objects shown in FIG. 8A may be provided with a color set according to a type of multimedia data. In this case, an overlapped part between the object 1 and the object 2 shown in FIG. 8b may be displayed in a different color. This may provide a visual effect to a user.

Figure 10:
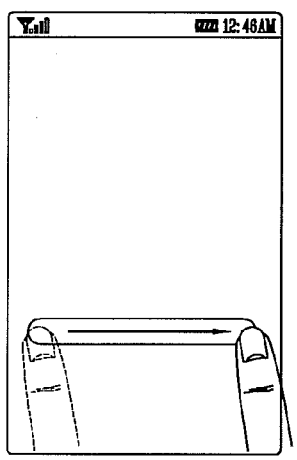
FIGS. 10A to 10C are views showing processes for generating objects by mapping position information to drawn patterns according to a fourth embodiment of the present invention.
Figure 10:
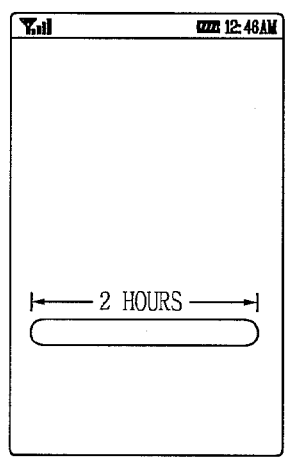
Figure 10:
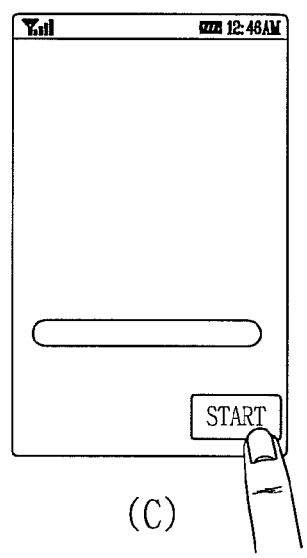
Figure 11:
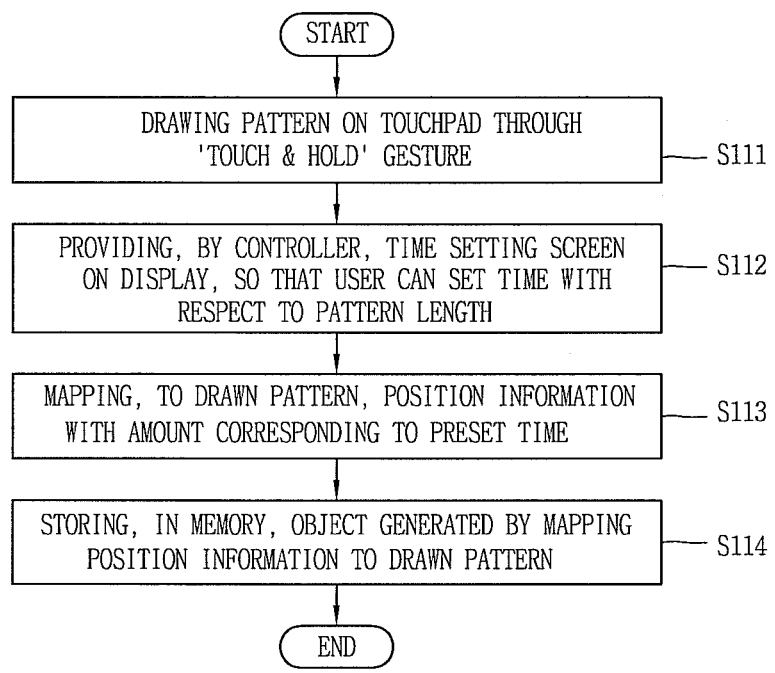
FIG. 11 is a flowchart showing the fourth embodiment of FIGS. 10A to 10C.

FIGS. 10A to 10C are views showing processes for generating objects by mapping position information to drawn patterns according to a fourth embodiment of the present invention, FIG. 11 is a flowchart showing the fourth embodiment of FIGS. 10a to 10c, and FIGS. 12a to 12d are views showing screens for displaying the objects generated in FIG. 10 according to a fourth embodiment of the present invention.

Hereinafter, the fourth embodiment of the present invention will be explained with reference to FIGS. 10 and 12.

As shown in FIG. 10a, a user draws a pattern on the touchpad 135 through a 'touch & hold' gesture with using a finger or a stylus pen, and so on. (S111). Then, the controller 180 detects the drawn pattern, and provides a time setting screen on the display so that the user can set a time with respect to a length of the pattern as shown in FIG. 10b (S112). For instance, the controller 180 monitors the user's tap gesture on the drawn pattern, and provides an interface screen on which an execution time of the drawn pattern is to be inputted.

In case of mapping position information on the drawn pattern as shown in FIGS. 10a and 10b, once input of a 'start' button on a screen of FIG. 10c is detected, position information according to a movement of the mobile terminal is mapped to the drawn pattern. That is, a position service providing program (e.g., navigation) mounted at the mobile terminal 100 is executed, position information (e.g., multimedia data) is mapped to the drawn pattern with an amount corresponding to a preset time (S113). For instance, when the length of the pattern is set as two hours, position information corresponding to two hours for which the user has moved with carrying the mobile terminal 100 (e.g., GPS coordinates information, AR (augment reality) related information collected on a moving path) is mapped to the drawn pattern. Alternatively, a time per unitary length on a screen may be set. In this case, once a user draws a pattern on the touchpad 135, a time corresponding to a length of the drawn pattern (e.g., a line length) may be displayed on the screen as shown in FIG. 10b.

As position information is mapped to the drawn pattern through S111-S113, an object regarding the position information is generated. As shown in FIG. 12, as a user moves, position information is mapped to a pattern having a length of two hours. For instance, FIG. 12a shows a screen on which position information has been mapped, the position information corresponding to one hour of two hours. FIG. 12b shows a screen on which position information has been mapped, the position information corresponding to two hours for which the user has moved.

The object generated by mapping position information to the drawn pattern may be stored in the memory (S114). The user may transmit the object stored in S140 to a specific party or group entirely or partially.

FIG. 12c shows a screen on which an object generated by mapping position information to the drawn pattern is executed. More concretely, once a user's selection is performed, the controller 180 detects the user's selection and reads an object from the memory. Here, the object is mapped with position information through FIGS. 12a and 12b. Once a user touches a specific part of the pattern shown in FIG. 12c, the controller 180 detects the touch and displays position information mapped to the specific part on the screen. FIG. 12d shows that an object including position information is executed as a user tracks a pattern. More concretely, the controller 180 detects touches inputted while a user tracks a pattern, and consecutively displays position information mapped to the corresponding pattern on the screen.

Figure 12:
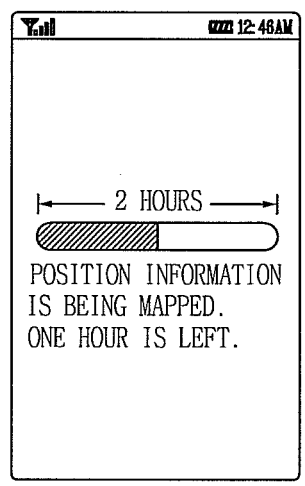
FIGS. 12A to 12D are views showing screens for displaying the objects generated in FIG. 10 according to a fourth embodiment of the present invention.
Figure 12:
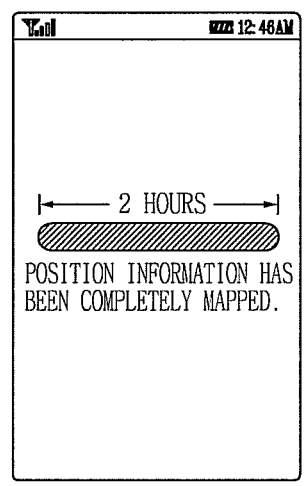
Figure 12:
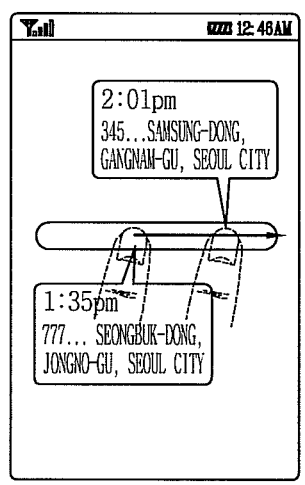
Figure 12:
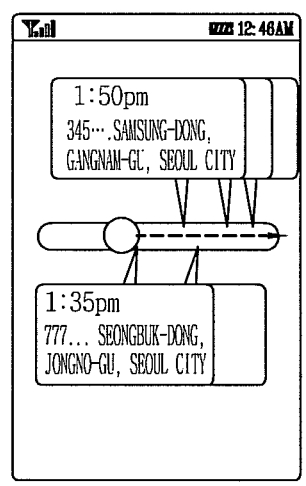

The objects generated by mapping position information to the drawn pattern shown in FIGS. 10 to 12 may include one or more types of multimedia data. For instance, the objects may be generated by mapping, to the drawn pattern, not only position information, but also music, image information, and so on.

Hereinafter, a method for editing and processing patterns according to the present invention will be explained with reference to FIGS. 13 to 15.

Figure 13:
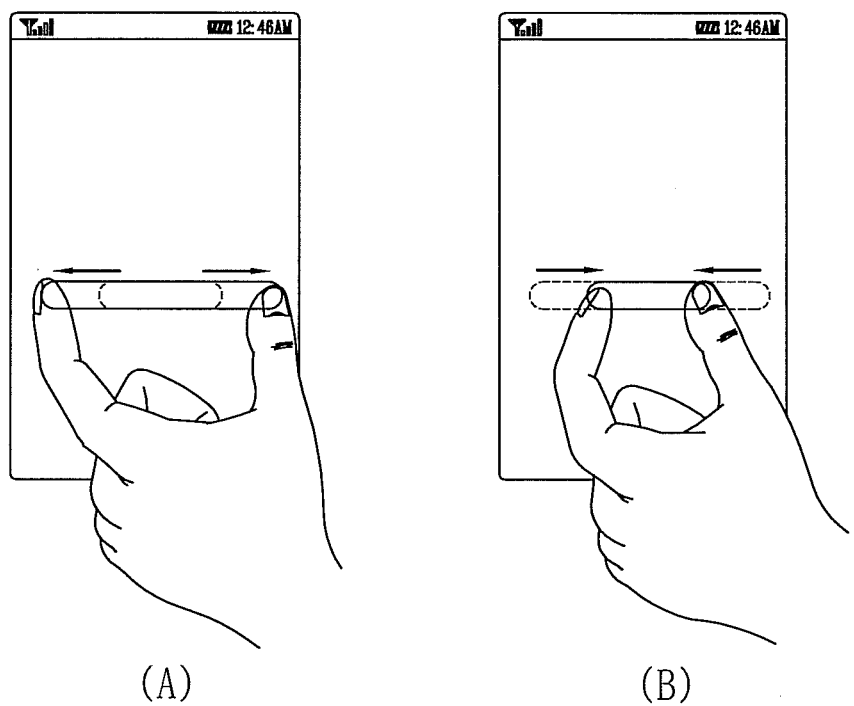
FIGS. 13A and 13B are views showing a method for extending and contracting a drawn pattern according to a fifth embodiment of the present invention.
Figure 14:
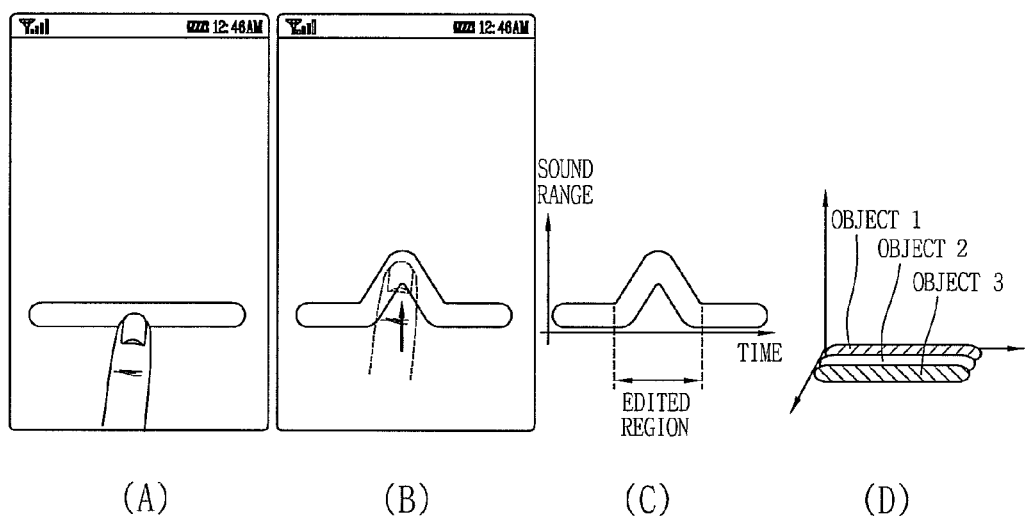
FIGS. 14A to 14D are views showing a method for editing a drawn pattern according to a fifth embodiment of the present invention.
Figure 15:
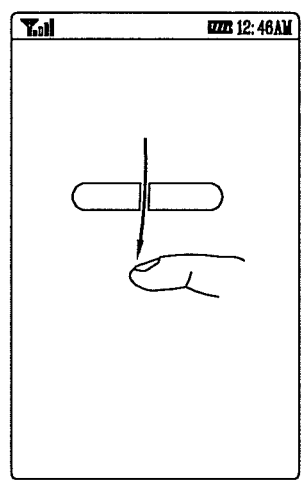
FIGS. 15A and 15B are views showing another method for editing a drawn pattern according to a fifth embodiment of the present invention.
Figure 15:
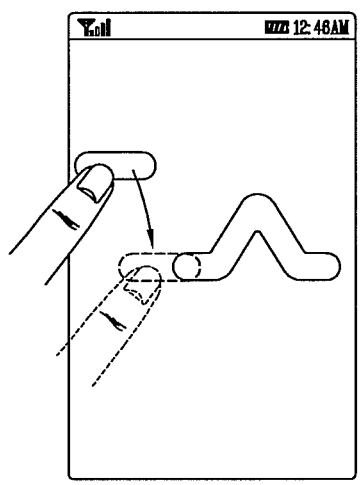

FIGS. 13 to 15 are views showing a method for editing and/or processing objects generated by mapping multimedia data to various drawn patterns according to a fifth embodiment of the present invention.

FIGS. 13A and 13B are views showing a method for extending and contracting a drawn pattern according to a fifth embodiment of the present invention. As shown in FIG. 13a, if a drawn pattern is extended through a 'pinch open' gesture, the controller 180 detects the 'pinch open' gesture on the touchpad 135. Then, the controller 180 extends the pattern through the inputted 'pinch open gesture'. On the contrary, if a drawn pattern is contracted through a 'pinch close' gesture, the controller 180 detects the 'pinch close' gesture on the touchpad 135. Then, the controller 180 extends the pattern through the inputted 'pinch close gesture'. As shown in FIGS. 13A and 13B, once the pattern is extended or contracted, multimedia data mapped to the pattern is also extended or contracted. For instance, on the assumption that multimedia data mapped to an extended pattern is a music source (e.g., voice, musical instrument sound, call details (call contents), and so on), if the extended pattern is executed as shown in FIG. 13a, the music source may be slowly outputted to an output device such as a speaker. Alternatively, on the assumption that multimedia data mapped to an extended pattern is position information, position information may be increased and thus the pattern may be corrected to a new pattern to which increased position information can be mapped as shown in FIG. 13a. Alternatively, on the assumption that multimedia data mapped to a contracted pattern is a music source (e.g., voices, musical instrument sounds, call details, and so on), if the contracted pattern is executed as shown in FIG. 13b, the music source may be rapidly outputted to an output device such as a speaker (an execution speed of the music source is enhanced). Alternatively, on the assumption that multimedia data mapped to a contracted pattern is position information, position information may be decreased by a contracted length and thus the pattern may be corrected to a new pattern as shown in FIG. 13b. The multimedia data mapped to the extended or contracted pattern shown in FIGS. 13a and 13b is merely exemplary. That is, processing the multimedia data mapped to the extended or contracted pattern may be variously implemented according to a user's convenience or a provider's policy.

FIGS. 14a to 14d are views showing a method for editing a drawn pattern according to a fifth embodiment of the present invention.

It is assumed that multimedia data mapped to a pattern shown in FIG. 14a is a musical instrument sound (an object of FIG. 14a is generated by mapping a musical instrument sound to a pattern). That is, a user may read an existing drawn pattern or a pattern stored in the memory as shown in FIG. 14a, and perform a 'touch & hold' gesture with respect to a specific part of the pattern thus to edit the pattern as shown in FIG. 14b. FIG. 14c shows a pattern transformed (processed) through the edition of FIG. 14b, in which the 'x'-axis indicates time and the 'y'-axis indicates a transformed (processed) degree of multimedia data. More concretely, the controller 180 detects a user's gesture performed on the touchpad 135 of FIG. 14b, and corrects a sound range (compass corresponding to the y-axis in FIG. 14c) of a firstly mapped musical instrument sound which corresponds to the 'edited region' of FIG. 14c. More concretely, when executing a corrected (processed) pattern, an object of FIG. 14b, the controller 180 controls a musical instrument sound mapped to the 'edition region', to be outputted with a range increased by an increased height of the pattern of FIG. 14c. The y-axis of FIG. 14c may be defined in various manners. For instance, if the y-axis indicates a rhythm, the rhythm may be rapidly output in correspondence to the increased height of the pattern on the 'edition region'.

On the assumption that the pattern of FIG. 14a is mapped with position information, if an object mapped with the position information is executed, a user's preset music may be outputted, or a screen color may be changed, or screen flickering may occur, and so on, through a setting on the 'edition region'.

As another embodiment of the present invention, patterns of two or more objects may be overlapped with each other as shown in FIG. 14d thus to be edited as shown in FIG. 14b, thereby generating one object. For instance, in FIG. 14d, it is assumed that an object 1 indicates a musical instrument sound (e.g., saxophone), an object 2 indicates a call voice, and an object 3 indicates a moving image regarding a street. When executing an object synthesized with three objects, a moving image of the object 3 may be displayed on a screen, and saxophone music of the object 1 may be played as background music, and the call voice of the object 2 may be played. That is, in FIG. 14d, the 'x'-axis indicates time, the 'y'-axis indicates a sound range, and the 'z'-axis indicates the number of patterns (or number of objects). If the object synthesized with three objects of FIG. 14d is edited as shown in FIG. 14b, music sources of the object 1 and the object 2 are played with a high range on the edit region. As aforementioned, the pattern may be variously edited or processed according to a user's preference. FIG. 14b corresponds to one embodiment of the present invention, and the present invention is not limited to this.

FIGS. 15a and 15b are views showing another method for editing a drawn pattern according to a fifth embodiment of the present invention. As shown in FIG. 15, different objects may be connected to each other through editions according to a user's preference, thereby being generated as a new object. The controller 180 may provide tools required to edit a drawn pattern on the screen. For instance, the tools may include a scissors for cutting (slicing) a pattern, a memo for inputting characters, an eraser for erasing a specific part of a pattern, a palette for painting a color to a pattern, and so on.

As shown in FIG. 15a, a user may cut a desired part of a pattern through a slicing gesture. Then, the user may synthesize the different patterns to each other through a 'touch & hold' gesture as shown in FIG. 15b.

The user may edit a generated object through FIGS. 13 to 15 according to his or her preference, thereby correcting or processing the object. The controller 180 detects gestures input to the touchpad 135 (gestures for editing patterns in FIGS. 13 to 15), and executes multimedia data, and so on corresponding to a pattern edited on the 'edition region' in a processing manner.

As another embodiment of the present invention, a drawn pattern may be painted with various colors, and each color may be set to indicate a type of specific multimedia data.

For instance, it is assumed that a red color is set to indicate a specific entertainer's voice, and a blue color is set to indicate a mynah's sound. In a state that a call voice has been mapped to a pattern drawn by a user, if the pattern is painted with a red color through editions, the pattern may be played with the specific entertainer's voice rather than the call voice. Alternatively, in a state that a musical instrument sound has been mapped to a pattern drawn by a user, if the pattern is painted with a blue color through editions, the pattern may be played with a mynah's sound rather than the musical instrument sound. Still alternatively, if the pattern mapped with a musical instrument sound is overlapped with a blue color, the pattern may be played with the mynah's sound together with the musical instrument sound. As aforementioned, multimedia data mapped to a drawn pattern may be processed through a color of the drawn pattern.

As still another embodiment of the present invention, the controller 180 may provide, on the screen, a list of objects stored in the memory 160 (independent contents generated by mapping one or more multimedia data to a drawn pattern) according to a type of multimedia data (e.g., voices, images, characters, musical instrument sounds, position information, and so on), or according to a pattern color, and so on. Alternatively, an object selected by a user from the object list provided by the controller 180 may be detected, and the selected object may be transmitted to a specific party (or group) through a communication module.

Further, in accordance with one embodiment of the present invention, the method can be implemented as computer-readable codes in a program-recorded medium. The computer-readable medium may include all types of recording devices each storing data readable by a computer system. Examples of such computer-readable media may include ROM, RAM, CD-ROM, magnetic tape, floppy disk, optical data storage element and the like. Also, the computer-readable medium may also be implemented as a format of carrier wave (e.g., transmission via an Internet).

The mobile terminal of the present invention provides various and fun gestures (gesture user experience (UX)), and provides a user-oriented graphic interface for mapping multimedia data by directly drawing a pattern through various gestures.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a memory; a display that includes a touchpad; and
a controller operatively connected to the memory and the display, and the
controller configured to:
detect a pattern drawn on the touchpad during a call;
extract call voices and information related to the call;
map the call voices and the information related to the call to the pattern drawn on the touchpad, wherein the call voices are currently being outputted or received at the mobile terminal while the pattern is being drawn on the touchpad,
wherein a shape of the drawn pattern is independent of the call voices and the information related to the call;
store information of the call voices and the information related to the call-mapped pattern in the memory;
display, on the display, a graphical object corresponding to the drawn pattern based on a user's selection; and
output call voices and the information related to the call in response to a touch input applied to the displayed graphical object,
wherein the controller forms a synthesized pattern based on at least two drawn patterns, and the controller provides a tool to edit the synthesized pattern.

2. The mobile terminal of claim 1, further comprising:
a communication module to transmit, to a specific entity, the call voices and the information related to the call-mapped pattern.

3. The mobile terminal of claim 1, wherein in response to receiving the user input at the touchpad, the controller edits the pattern displayed on the display.

4. The mobile terminal of claim 1, wherein the controller controls the display to display the information related to the call on an adjacent area with the displayed graphical object.

5. The mobile terminal of claim 1, wherein the controller controls the display to display a plurality of patterns stored in the memory, the controller to detect, based on an input from a user, selection of a specific pattern from the displayed plurality of patterns, and the controller to transmit the specific pattern to a specific entity.

6. The mobile terminal of claim 1, wherein the controller displays, on the display, a plurality of patterns stored in the memory, the controller detects the call voices and the information related to the call-mapped pattern to an overlapped part between the displayed patterns, and the controller outputs the detected call voices and the information related to the call.

7. A method to provide multimedia data, the method comprising:
   receiving an input of a pattern drawn on a display of a mobile terminal during a call;
   extracting call voices and information related to the call:
   mapping the call voices and the information related to the call to the drawn pattern,
   wherein the call voices are currently being outputted or received at the mobile terminal while the pattern is being drawn on the touchpad,
   wherein a shape of the drawn pattern is independent of the call voices and the information related to the call;
   storing the call voices and the information related to the call mapped to the pattern as a multimedia data-mapped pattern in a memory of the mobile terminal;
   displaying, on the display, a graphical object corresponding to the drawn pattern based on a user's selection; and
   outputting the call voices and the information related to the call in response to a touch input applied to the graphical object further comprising forming a synthesized pattern based on at least two drawn patterns, and providing a tool for a user to edit the synthesized pattern.

8. The method of claim 7, further comprising transmitting, to a specific entity, the call voices and the information related to the call-mapped pattern.

9. The method of claim 7, further comprising editing the pattern displayed on the display.

10. The method of claim 7, further comprising displaying the information related to the call on an adjacent area with the displayed graphical object.

11. The method of claim 7, wherein the call voices are output based on movement of the touch input applied to the graphical object.

12. The method of claim 7, further comprising:
   displaying a plurality of patterns stored in the memory;
   detecting, based on an input of a user, a specific pattern from the displayed plurality of patterns; and
   transmitting the detected specific pattern to a specific entity.

13. The method of claim 7, further comprising:
   displaying a plurality of stored patterns;
   detecting the call voices and the information related to the call mapped to an overlapped part between the displayed patterns; and
   outputting the detected call voices and the information related to the call.

14. The method of claim 7, wherein the pattern includes a first pattern and a second pattern, wherein first multimedia data corresponding to a caller's voice is mapped to the first pattern during a call, and second multimedia data corresponding to a caller's voice is mapped to the second pattern during a call.

15. The method of claim 7, wherein outputting the call voices and the information related to the call includes displaying an image relating to the call mapped to the pattern.

* * * * *